Nov. 12, 1940.   F. M. KUHNER   2,221,142
STEAM GENERATOR
Filed Aug. 30, 1939   5 Sheets-Sheet 1

Inventor
FREDERICK M. KUHNER
By Albert G. Blodgett
Attorney

Inventor
FREDERICK M. KUHNER
By Albert G. Blodgett
Attorney

Nov. 12, 1940.  F. M. KUHNER  2,221,142
STEAM GENERATOR
Filed Aug. 30, 1939  5 Sheets-Sheet 4

Inventor
FREDERICK M. KUHNER
By Albert G. Blodgett
Attorney

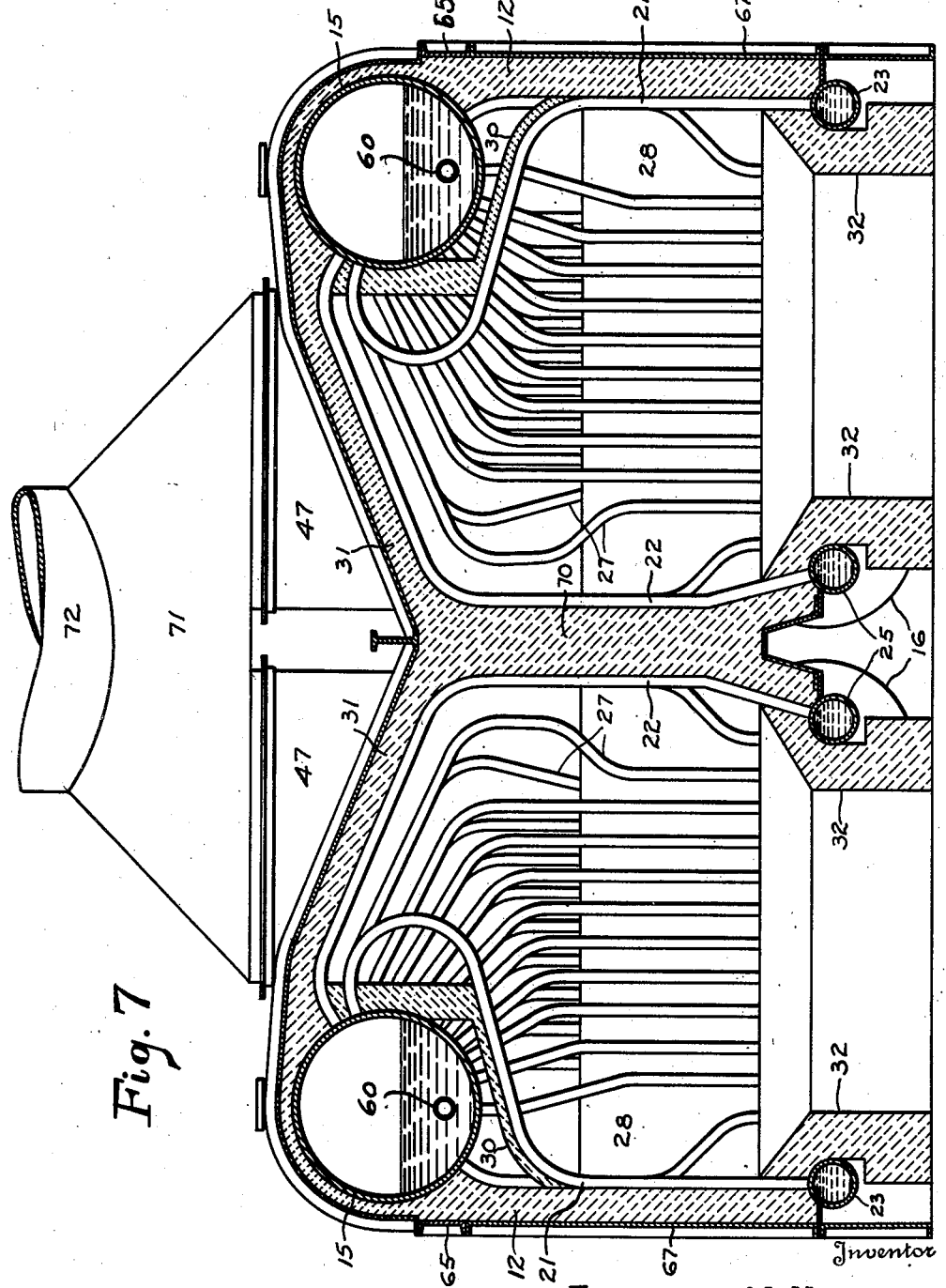

Patented Nov. 12, 1940

2,221,142

UNITED STATES PATENT OFFICE 2,221,142

STEAM GENERATOR

Frederick M. Kuhner, Worcester, Mass.

Application August 30, 1939, Serial No. 292,592

14 Claims. (Cl. 122—347)

This invention relates to steam generators, and more particularly to steam generators of the water tube type having an integral combustion chamber with water cooled walls and a bank of water tubes to which heat is transferred by convection from the gaseous products of combustion.

It is one object of the invention to provide a steam generator which will be of a more compact construction than those of the prior art and adapted to produce steam at a high rate in comparison with the space required for installation.

It is a further object of the invention to provide a steam generator which will require comparatively little head-room for installation and yet afford a combustion chamber of ample size.

It is a further object of the invention to provide a steam generator which will be capable of responding to rapid changes in the demand for steam without excessive fluctuations in the water level.

It is a further object of the invention to provide a steam generator having a longitudinally extending steam-and-water drum which is thoroughly protected from the radiant heat of the combustion chamber.

It is a further object of the invention to provide a steam generator which can be enclosed in a metal casing of unusually simple and inexpensive construction.

It is a further object of the invention to provide a steam generator of comparatively large capacity which can be completely assembled at the point of manufacture and shipped as a unit.

It is a further object of the invention to provide a water tube steam generator of comparatively simple construction so arranged that the hot gases will flow transversely of the water tubes.

It is a further object of the invention to provide a steam generator with an integral combustion chamber having water cooled walls, and a simple and effective arrangement for maintaining a rapid circulation of water through the said walls.

It is a further object of the invention to provide a steam generator having a superheater of efficient construction combined therewith in a novel manner.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal section through a steam generator, the section being taken on the line 1—1 of Fig. 3;

Fig. 7 is a section similar to Fig. 5 but showing two steam generators set in battery.

Figure 2:
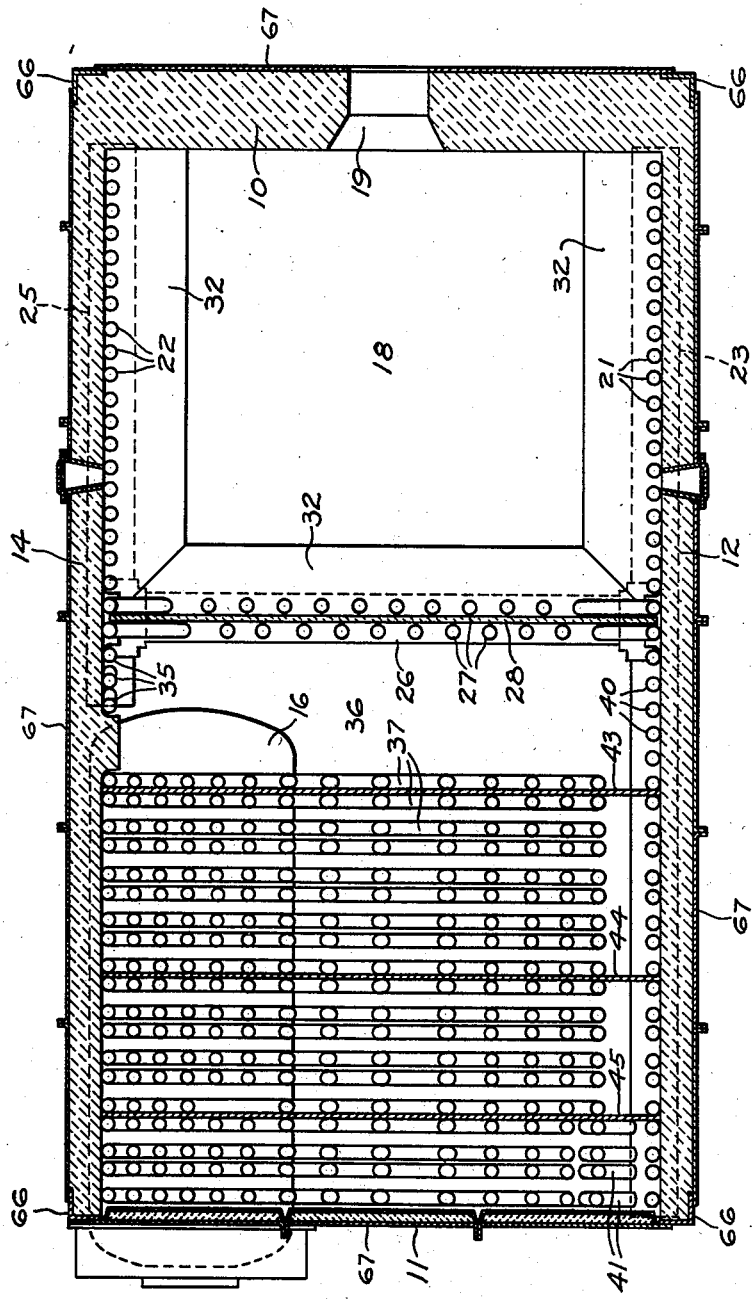
Fig. 2 is a section on the line 2—2 of Fig. 1.

The embodiment illustrated comprises a setting rectangularly shaped in plan view, as shown in Fig. 2, and having a front wall 10, a rear wall 11, and two side walls 12 and 14. A steam-and-water drum 15 and a water drum 16 are mounted within the setting and extend longitudinally thereof, parallel with the side walls. These drums are located in diagonally opposed positions, as shown particularly in Fig. 3, the drum 15 being positioned adjacent the upper portion of the side wall 12, and the drum 16 being positioned adjacent the lower portion of the side wall 14. The steam-and-water drum 15 extends throughout substantially the entire length of the setting, whereas the water drum 16 is comparatively short and is located in the rear portion of the setting. The front portion of the setting is utilized as a furnace or combustion chamber 18 in which any suitable fuel may be burned. As shown in Fig. 2, the front wall 10 is provided with a burner opening 19 for the introduction of fuel such as oil, gas or pulverized coal adapted to be burned in suspension.

Figure 5:
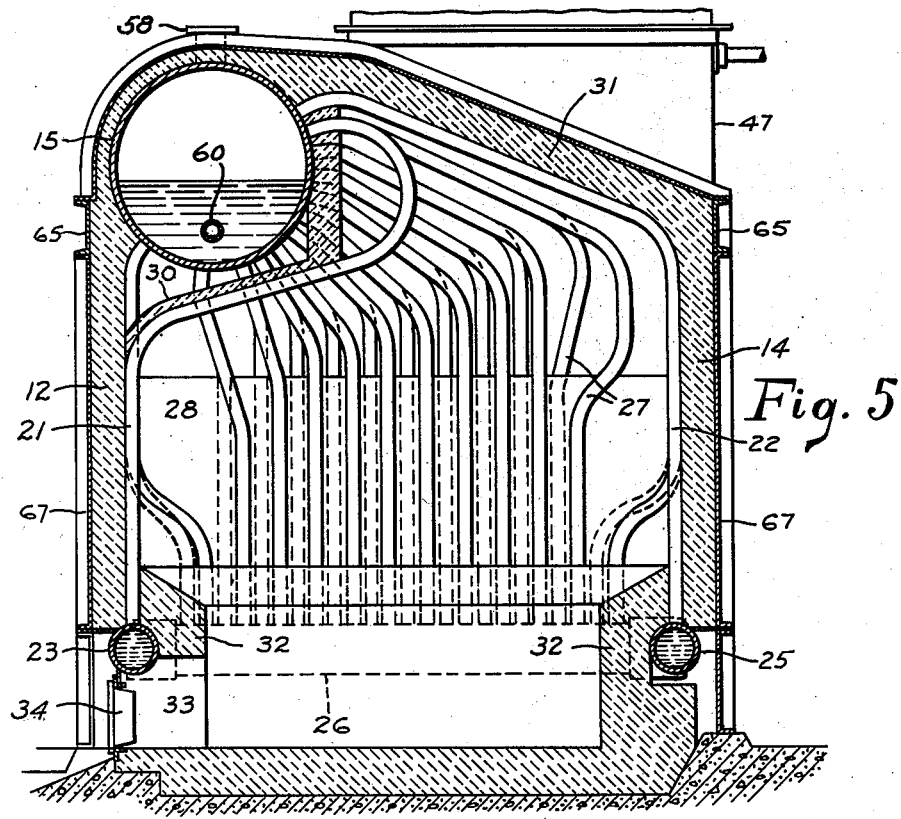
Fig. 5 is a section on the line 5—5 of Fig. 1.
Figure 6:
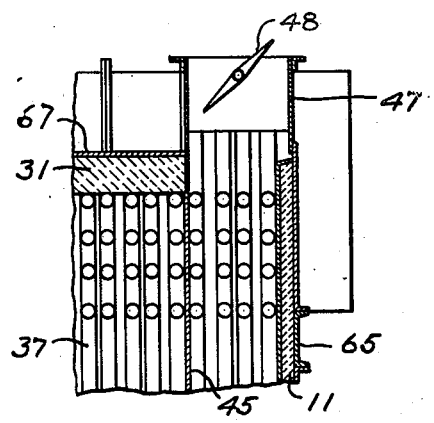
Fig. 6 is a fragmentary section on the line 6—6 of Fig. 3.

The sides and rear of the combustion chamber are provided with water tubes arranged to absorb radiant heat from the burning fuel and generate steam at a high rate. For this purpose a row of upright water wall tubes 21 is provided adjacent the inner surface of the side wall 12, and a row of upright water wall tubes 22 is provided adjacent the inner surface of the side wall 14. The tubes 21 are connected at their lower ends to a longitudinal header 23 which extends substantially the length of the setting, and the tubes 22 are connected at their lower ends to a comparatively short longitudinal header 25 which extends rearwardly only as far as the front end of the water drum 16. These two headers are connected by a transverse header 26 located at the rear of the combustion chamber 18 and spaced forwardly a short distance in front of the water drum 16. From the header 26 two transverse rows of upright water tubes 27 extend upwardly to the steam-and-water drum 15 and serve to support a bridge wall 28 of refractory material located between the tube rows. The lower portions of the tubes 27 are staggered to increase the ligament strength of the header 26, and the upper portions of each pair of tubes are brought into alignment longitudinally of the drum 15 before they enter the same, as shown in Fig. 5. Two of the tubes 27 at each end of the header 26 are bent outwardly at their lower ends into contact with the adjacent side walls 12 and 14. The upper portions of the side water wall tubes 21 are bent inwardly beneath the upper drum 15 and then curve upwardly and outwardly to enter this drum at the inner side thereof and well above the normal water level. The inwardly extending portions of these tubes support refractory material 30 which protects the drum surface from the radiant heat of the combustion chamber. The upper portions of the side water wall tubes 22 are bent inwardly and enter the upper drum 15 directly above the tubes 21, the inwardly extending portions of the tubes 22 serving to support the roof 31 of the setting above the combustion chamber. The headers 23, 25 and 26 are protected from the heat of the burning fuel by means of low refractory walls 32 one of which may be provided with an opening 33 (Fig. 5) normally closed by a door 34, to afford access to the combustion chamber, or the removal of ashes therefrom. A few water tubes 35 extend upwardly from the header 25 in the rear of the bridgewall 28 to the upper drum 15, these tubes being of the same shape as the tubes 22.

Figure 1:
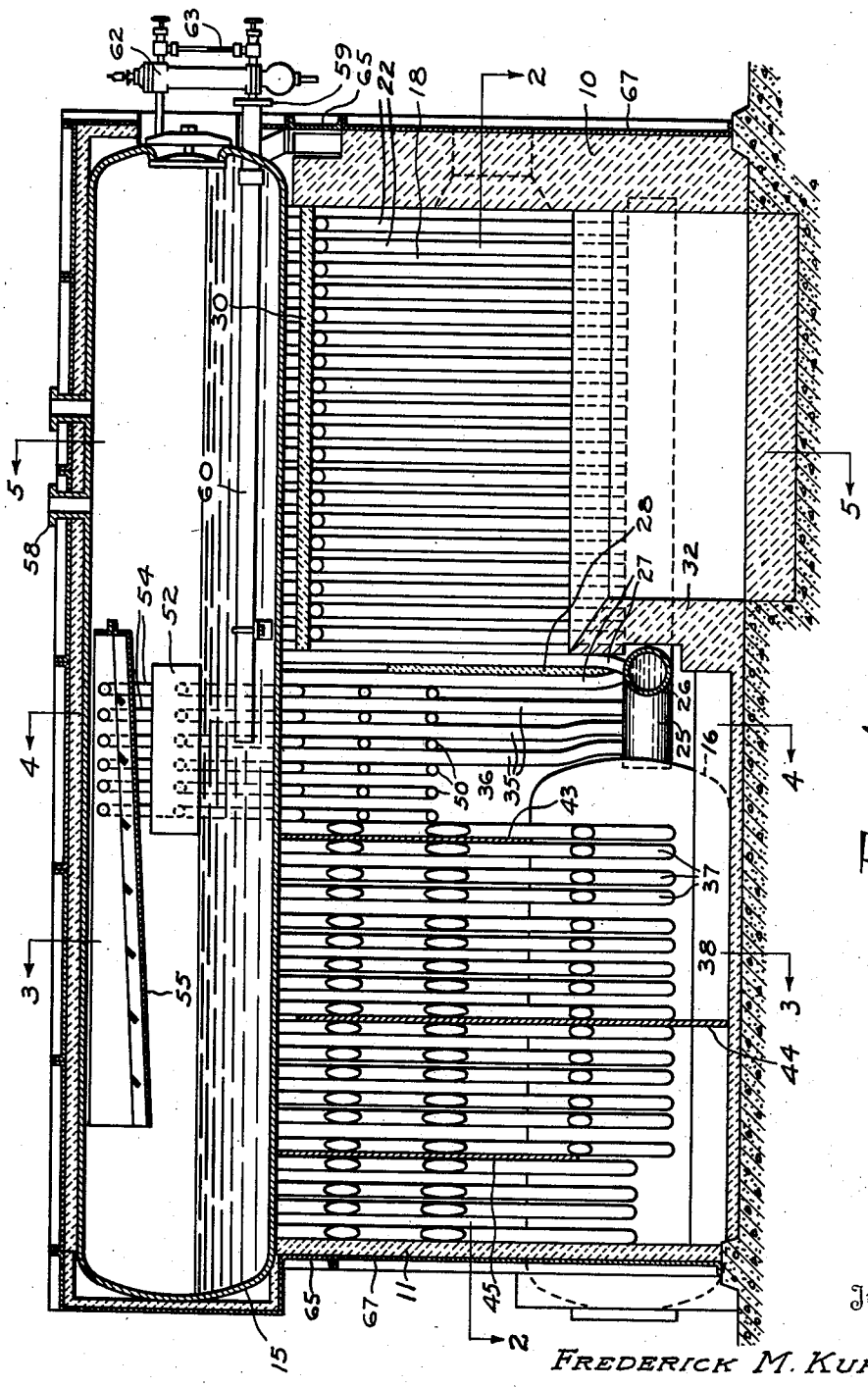

The hot gaseous products of combustion flow rearwardly over the top of the bridge wall 28, and after passing through the space 36 immediately in the rear of the bridgewall they are brought into contact with a bank of water tubes 37 arranged to be heated by convection. As shown particularly in Fig. 3, the tubes 37 are connected at their opposite ends to the drums 15 and 16 respectively, and they are so shaped and arranged as to substantially fill the rear portion of the setting except for a space 38 at the bottom thereof. It will be noted that the tubes 37 flare outwardly from the drums in a fan-shaped arrangement, each tube having two straight portions arranged at an angle and joined by a curved portion, and that the tube bank is substantially symmetrical with respect to the laterally inclined plane defined by the axes of the drums. The tubes 37 are arranged in a plurality of spaced vertical rows extending transversely of the setting, and each row contains a plurality of pairs of tubes with the tubes in each pair identical in shape but placed in reversed positions on opposite sides of the said laterally inclined plane. This greatly decreases the number of shapes required. The tubes at the top of the bank serve to cool and support the adjacent portion of the side wall 14 and the roof 31 of the setting. The portion of the side wall 12 located in the rear of the bridgewall 28 is cooled and supported by a row of upright water tubes 40 which connect the upper drum 15 to the header 23 therebeneath. This drum and header are also connected at the rear of the setting by four upright water tubes 41, four of the tubes 37 being omitted from the lowermost row to provide room for these tubes 41. As shown particularly in Figs. 1 and 2, the tubes 37 are arranged in transverse rows, with the spaces between the rows alternately wide and narrow, to facilitate the replacement of individual tubes.

Figure 3:
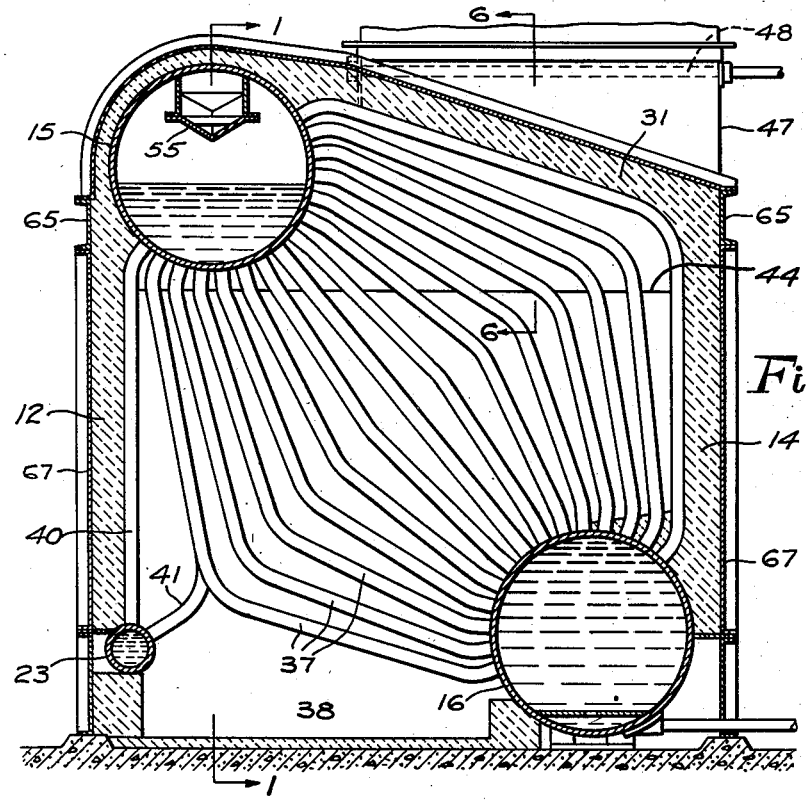
Fig. 3 is a section on the line 3—3 of Fig. 1.

In order to direct the hot gases into intimate contact with the water tubes 37, a system of transverse baffles is provided. This system includes a front baffle 43, an intermediate baffle 44, and a rear baffle 45. The front baffle 43 and the rear baffle 45 both extend downwardly from the roof 31 of the setting and terminate somewhat above the floor. The intermediate baffle 44 extends upwardly from the floor and terminates somewhat below the roof 31. The hot gases after leaving the space 36 flow beneath the baffle 43 to the space 38, and thence upwardly and laterally in contact with the tubes 37 between the baffles 43 and 44, and thence rearwardly over the top of the baffle 44. The gases thereupon flow downwardly and laterally between the baffles 44 and 45, rearwardly beneath the baffle 45, and upwardly and laterally in the rear gas pass between the baffle 45 and the rear wall 11. At the upper end of this rear pass the gases enter an upwardly directed gas outlet duct 47 provided with a damper 48. As shown in Fig. 3, this duct 47 is located above the lower drum 16 and between the upper drum 15 and the opposite side wall 14. It will be apparent that the gas flow is for the most part transversely or cross-wise of the water tubes 37, ensuring rapid and efficient transfer of heat.

Figure 4:
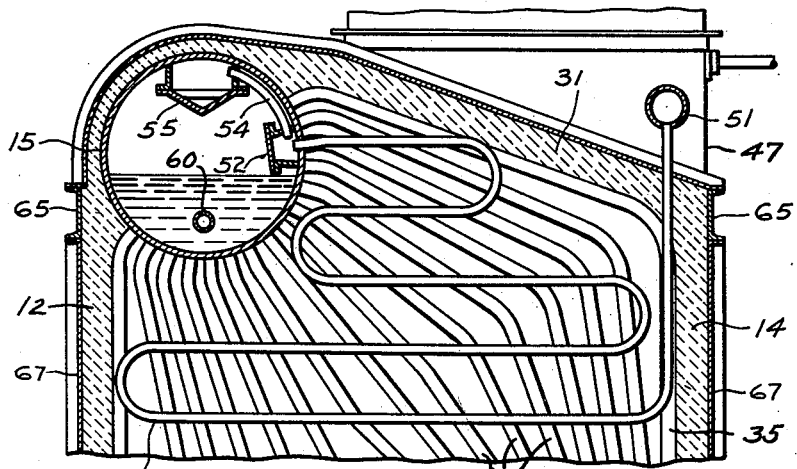
Fig. 4 is a fragmentary section on the line 4—4 of Fig. 1.

The space 36 between the bridgewall 28 and the front row of tubes 37 is utilized for the installation of superheater tubes 50. These tubes 50 are connected at their inlet ends to the upper drum 15, as shown in Fig. 4, and extend downwardly in a series of back and forth loops and thence upwardly adjacent the side wall 14 and through the roof 31 to an outlet header 51. In order to ensure delivery of substantially dry steam to the superheater, the inlet ends of the tubes 50 are enclosed within the drum 15 by a box 52, and this box is connected by means of a row of tubes 54 to a steam separator or dry pan in the form of an elongated hollow enclosure 55 located in the upper portion of the drum 15 and opening toward the rear of the drum. To enter the enclosure 55, the steam must first flow rearwardly and then make a sharp turn of 180 degrees, which will cause most of the suspended moisture to be thrown out of the steam. Further separation of moisture will take place during the forward travel of the steam in the enclosure 55.

The upper drum 15 is provided with the usual fittings and accessories, including safety valve nozzles 58, a feed water nozzle 59 at the front of the drum leading to a feed water distributing pipe 60 within the drum, and a water column 62 and gauge glass 63 at the front of the drum. This drum is supported by a rectangular frame 65 formed of channel members, which completely surrounds the boiler setting. The frame 65 is carried by four columns 66 (Fig. 2) formed of angle members and located at the corners of the setting. The entire setting is enclosed in a metal casing 67 arranged to support the refractory material of the walls and prevent infiltration of air.

My improved steam generator is well adapted for a battery setting, as shown in Fig. 7, in which two steam generators of right and left construction respectively are mounted in a common setting, with a battery wall 70 between them. This wall takes the place of the side wall 14 of the single setting. With this construction the two gas outlet ducts 47 are located adjacent one another and can easily be connected by a breeching 71 to a single stack 72. Since the steam generators shown in Fig. 7 are otherwise of the same construction as in the previous figures, the same reference numerals have been applied.

The operation of the invention will now be apparent from the above disclosure. A suitable fuel is introduced through the opening 19 and burns within the combustion chamber 18. If ashes are deposited, they may be removed through the door 34. The hot gases are cooled by radiation of heat to the water wall tubes 21 and 22, and to the bridgewall tubes 27. The gases flow rearwardly over the bridgewall 28 into contact with the superheater 50, and then are directed into cross-flow contact with the water tubes 37 by means of the baffles 43, 44 and 45, the gases finally escaping upwardly through the duct 47. Water is supplied from the upper drum 15 to the lower drum 16 by means of the tubes 37 near the rear of the setting, where the gas temperature is low. Water is supplied from the upper drum to the header 23 by means of the four tubes 41 and the tubes 40 near the rear of the setting. The headers 25 and 26 receive water from the header 23. Steam will be generated rapidly in the water wall tubes 21 and 22, the bridgewall tubes 27, the tubes 35, and the tubes 37 and 40 nearest the bridgewall. This steam will be released in the upper drum 15 and after passing through the separator 55 it will be delivered by the tubes 54 and box 52 to the superheater tubes 50 and thence to the outlet header 51.

It will be noted that my improved steam generator requires comparatively little head room, and yet because of the offset position of the upper drum 15 a combustion chamber of ample height is obtained, as appears particularly in Fig. 5. The long upper drum provides a large storage capacity for water and steam, so that rapid changes in the demand for steam can readily be met without excessive variations in water level. The front portion of the upper drum is well protected from radiant heat and high temperature gases, eliminating thermal stresses in the drum shell and deterioration of the drum metal. The front end of the lower drum is protected from the radiant heat of the combustion chamber by the walls 29 and 32. A large part of the steam is discharged into the upper drum above the normal water level, ensuring a steady water line and dry steam, and making it feasible to carry a higher boiler water concentration without foaming and priming. Individual boiler tubes can be readily replaced without disturbing other tubes. All tubes are accessible for cleaning from the upper drum without the necessity for opening the header handholes. The water circulation is unidirectional and rapid. The water wall system is supplied with comparatively clean water from the rear portion of the upper drum, and cannot receive sludge, which may settle in the lower drum and be blown down therefrom periodically. The foundation required is very simple and inexpensive, and substantially the entire generator can be assembled in the shop and shipped as a unit. Very little brickwork is required, since the water cooled walls can be constructed of tile and insulation. Cross-flow of the gases over the convection tubes 37 ensures rapid transfer of heat and high overall efficiency. The superheater is mounted in a separate space free from water tubes, and is readily accessible for inspection and maintenance. There is no superheater inlet header and no external piping between the boiler and the superheater, so that a minimum of joints is required. The external shape of the unit is such that the outer casing 67 is comparatively simple and inexpensive.

Having thus described my invention, what I claim as new and desire to secure by Letters Patent is:

1. A steam generator comprising a setting shaped to provide a combustion chamber in the front portion thereof, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber, and a row of water wall tubes at the side of the combustion chamber adjacent the upper drum, the upper portions of the water wall tubes being bent inwardly beneath the upper drum and then upwardly and outwardly to connect with the inner side of the upper drum.

2. A steam generator comprising a setting shaped to provide a combustion chamber in the front portion thereof, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber, a row of water wall tubes at the side of the combustion chamber adjacent the upper drum, the upper portions of the water wall tubes being bent inwardly beneath the upper drum and then upwardly and outwardly to connect with the inner side of the upper drum, and a second row of water wall tubes at the side of the combustion chamber opposite the upper drum, the upper portions of the last-mentioned water wall tubes being bent inwardly and sloping upwardly to connect with the inner side of the upper drum.

3. A steam generator comprising a setting shaped to provide a combustion chamber in the front portion thereof and a rear gas outlet, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber to the said rear gas outlet, baffle means associated with the water tubes to deflect the gases during their rearward travel, a longitudinal header beneath the upper drum and at the same side of the setting, tubes arranged to supply water from the upper drum to the rear portion of the header, and water wall tubes extending upwardly from the front portion of the header to the upper drum.

4. A steam generator comprising a setting shaped to provide a combustion chamber in the front portion thereof, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber, a longitudinal header beneath the upper drum and at the same side of the setting, tubes arranged to supply water from the upper drum to the rear portion of the header, a longitudinal header at the opposite side of the setting, a transverse header located at the rear of the combustion chamber and connecting the two longitudinal headers, and water wall tubes at both sides of the combustion chamber connecting the two longitudinal headers with the upper drum.

5. A steam generator comprising a setting shaped to provide a combustion chamber in the front portion thereof, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber, a longitudinal header beneath the upper drum and at the same side of the setting, tubes arranged to supply water from the upper drum to the rear portion of the header, water wall tubes extending upwardly from the front portion of the header to the upper drum, a transverse header connected to the longitudinal header and located at the rear of the combustion chamber, water tubes extending upwardly from the transverse header to the upper drum, and a refractory bridgewall supported by the last-mentioned water tubes.

6. A steam generator comprising a setting shaped to provide a combustion chamber in the front portion thereof, a longitudinal lower water drum located adjacent one side of the setting and rearwardly of the combustion chamber, a longitudinal upper steam-and-water drum located adjacent the other side of the setting, the said upper drum extending substantially the length of the setting, a bank of water tubes connecting the lower drum to the rear portion of the upper drum and arranged to be heated by gases flowing rearwardly from the combustion chamber, a longitudinal header beneath the upper drum and at the same side of the setting, tubes arranged to supply water from the upper drum to the rear portion of the header, water wall tubes extending upwardly from the front portion of the header to the upper drum, a transverse header connected to the longitudinal header and located at the rear of the combustion chamber, two rows of water tubes extending upwardly from the transverse header to the upper drum, and a refractory bridgewall supported between the said two rows, the lower portions of the water tubes in the said rows being staggered and the upper portions of the tubes in the respective rows being aligned.

7. A steam generator comprising a setting shaped to provide a combustion chamber in the front portion thereof, a longitudinal lower water drum located rearwardly of the combustion chamber, a longitudinal upper steam-and-water drum above the water drum and extending forwardly beyond the front end thereof, a bank of water tubes connecting said drums and arranged to be heated by gases flowing rearwardly from the combustion chamber, a bridge wall spaced forwardly from the tube bank, superheater tubes located between the bridge wall and the tube bank and connected at one end to the upper drum, a box enclosing the said ends of the superheater tubes within the upper drum, a steam separator within the upper drum, and tubes within the upper drum connecting the steam separator with said box.

8. A steam generator comprising a setting shaped to provide a combustion chamber in the front portion thereof and a rear gas outlet, the setting including two spaced upright side walls located at opposite sides of the combustion chamber and extending rearwardly beyond the same, a longitudinal lower water drum located within the rear portion of the setting and adjacent one of the side walls, a longitudinal upper steam-and-water drum located within the setting and adjacent the other of the side walls, a bank of water tubes connecting said drums and arranged to be heated by gases flowing rearwardly from the combustion chamber to the said rear gas outlet, and baffle means associated with the water tubes arranged to deflect the gases in a tortuous course during their rearward travel.

9. A steam generator comprising a setting shaped to provide a combustion chamber in the front portion thereof and a rear gas outlet, the setting including two spaced upright side walls located at opposite sides of the combustion chamber and extending rearwardly beyond the same, a longitudinal lower water drum located within the rear portion of the setting and adjacent one of the side walls, a longitudinal upper steam-and-water drum located within the setting and adjacent the other of the side walls, a bank of water tubes connecting said drums and arranged to be heated by gases flowing rearwardly from the combustion chamber to the said rear gas outlet, the water tubes flaring outwardly from each drum in a fan shaped arrangement, and baffle means associated with the water tubes arranged to deflect the gases in a tortuous course during their rearward travel.

10. A steam generator comprising a setting shaped to provide a combustion chamber in the front portion thereof and a rear gas outlet, the setting including two spaced upright side walls located at opposite sides of the combustion chamber and extending rearwardly beyond the same, a longitudinal lower water drum located within the rear portion of the setting and adjacent one of the side walls, a longitudinal upper steam-and-water drum located within the setting and adjacent the other of the side walls, means to protect the front end of the said lower drum from the radiant heat of the combustion chamber, a bank of water tubes connecting said drums and arranged to be heated by gases flowing rearwardly from the combustion chamber to the said rear gas outlet, and baffle means associated with the water tubes arranged to deflect the gases in a tortuous course during their rearward travel.

11. A steam generator comprising a setting shaped to provide a combustion chamber in the front portion thereof and a rear gas outlet, a longitudinal lower water drum located adjacent one side of the setting with its front end positioned rearwardly of the combustion chamber, a longitudinal upper steam-and-water drum located adjacent the other side of the setting, a bank of water tubes connecting said drums and arranged to be heated by gases flowing rearwardly from the combustion chamber to the said rear gas outlet, and baffle means associated with the water tubes arranged to deflect the gases in a tortuous course during their rearward travel.

12. A steam generator comprising a setting shaped to provide a combustion chamber in the front portion thereof and a rear gas outlet, a longitudinal lower water drum located adjacent one side of the setting with its front end positioned rearwardly of the combustion chamber, a longitudinal upper steam-and-water drum located adjacent the other side of the setting, a bank of water tubes connecting said drums and arranged to be heated by gases flowing rearwardly from the combustion chamber to the said rear gas outlet, the water tubes being arranged in a plurality of spaced vertical rows extending transversely of the setting, each row containing a plurality of pairs of tubes and the tubes in each pair being identical in shape but placed in reversed positions on opposite sides of the laterally inclined plane defined by the axes of the drums, and baffle means associated with the water tubes arranged to deflect the gases in a tortuous course during their rearward travel.

13. A steam generator comprising a setting shaped to provide a combustion chamber in the front portion thereof and a rear gas outlet, a longitudinal lower water drum located adjacent one side of the setting with its front end positioned rearwardly of the combustion chamber, a longitudinal upper steam-and-water drum located adjacent the other side of the setting, a bank of water tubes connecting said drums and arranged to be heated by gases flowing rearwardly from the combustion chamber to the said rear gas outlet, the water tubes being arranged in a plurality of spaced vertical rows extending transversely of the setting, each row containing a plurality of water tubes each of which is formed with two straight portions arranged at an angle and joined by a curved portion, the straight portions of the tubes flaring outwardly from the drums in a fan-shaped arrangement, and baffle means associated with the water tubes arranged to deflect the gases in a tortuous course during their rearward travel.

14. A steam generator comprising a setting shaped to provide a combustion chamber in the front portion thereof and a rear gas outlet, a longitudinal lower water drum located adjacent one side of the setting with its front end positioned rearwardly of the combustion chamber, a longitudinal upper steam-and-water drum located adjacent the other side of the setting, a bank of water tubes connecting said drums and arranged to be heated by gases flowing rearwardly from the combustion chamber to the said rear gas outlet, and upright baffles associated with the water tubes and arranged to direct the said gases in paths which cross in alternate directions the plane defined by the axes of the drums.

FREDERICK M. KUHNER.